July 12, 1949.　　　M. L. NATHAN　　　2,475,911
COMBUSTION APPARATUS

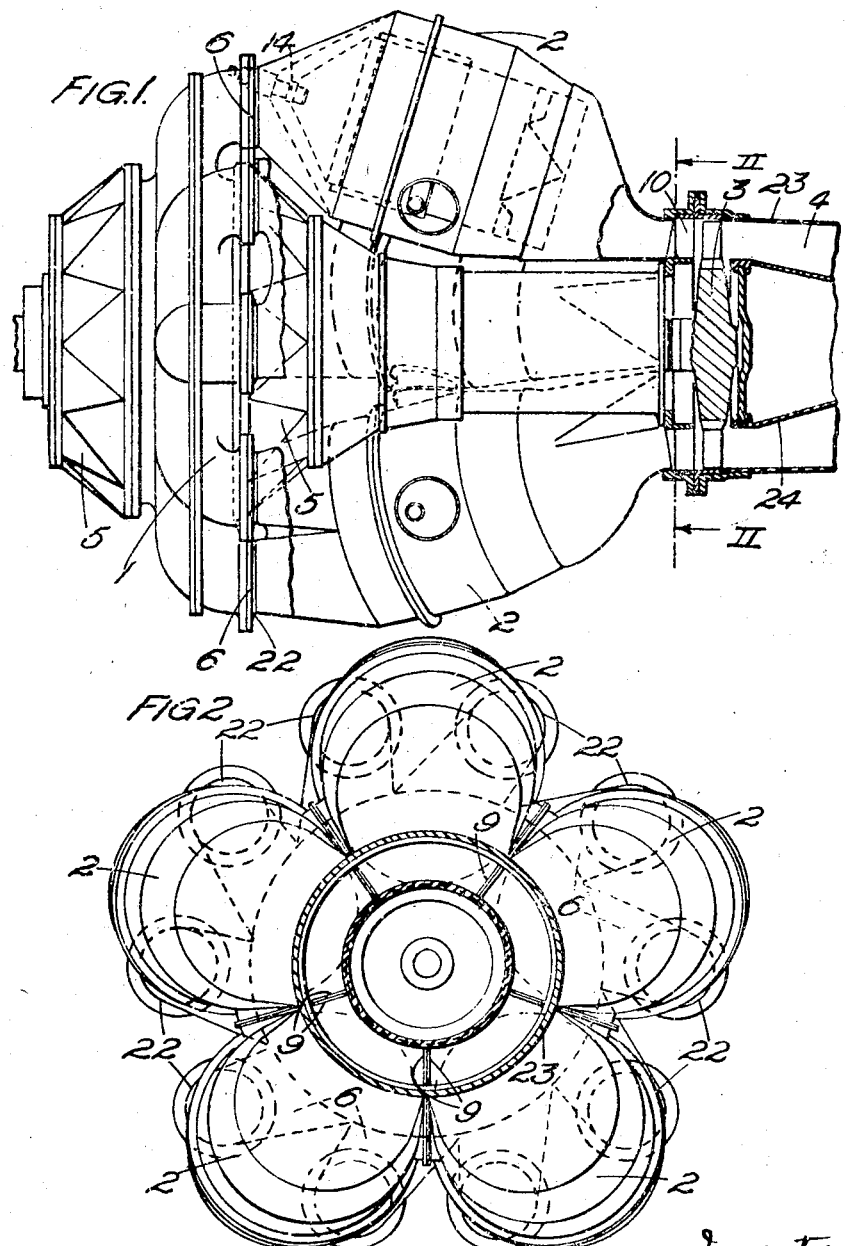

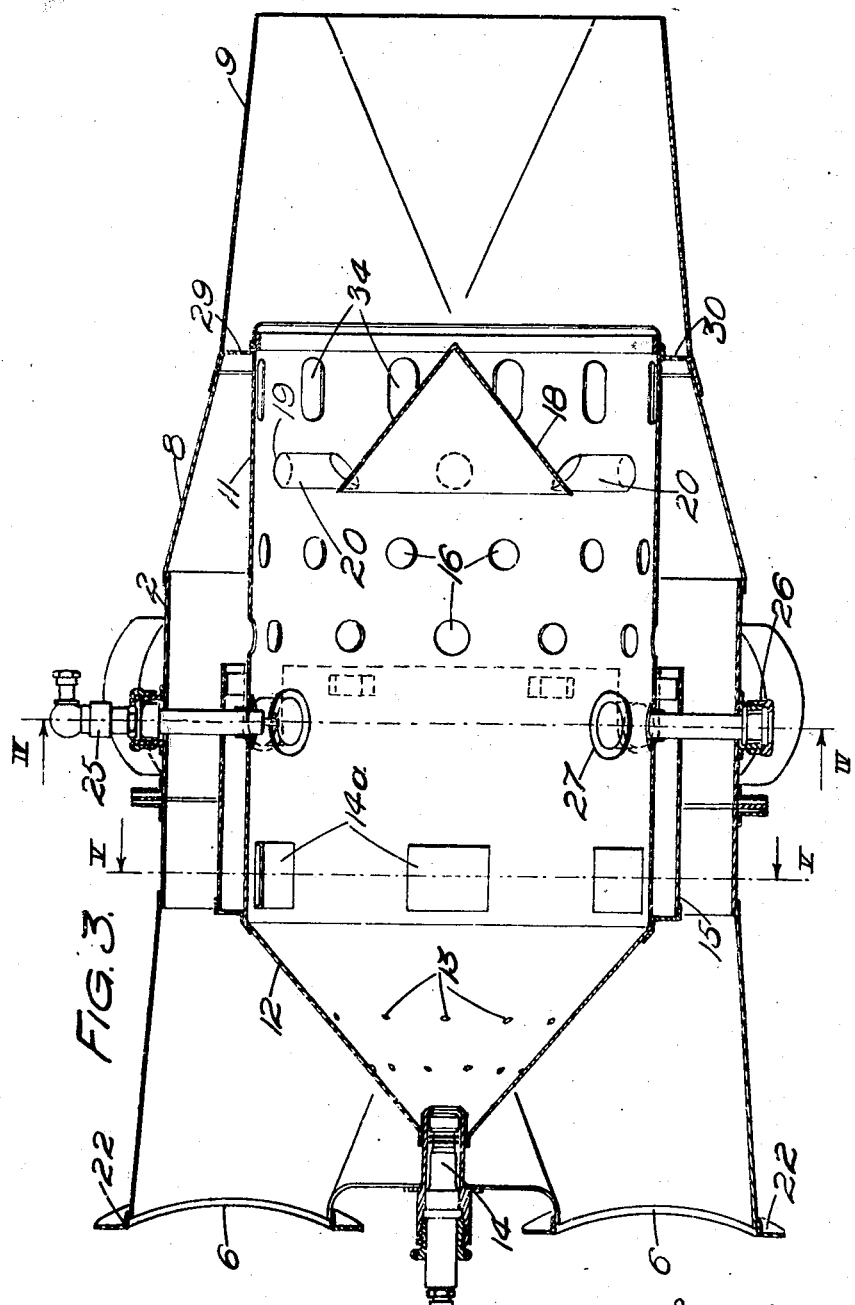

Filed Oct. 9, 1945　　　3 Sheets-Sheet 3

Inventor
Matthew Lewis Nathan
by Stevens and Davis
his attorneys

Patented July 12, 1949

2,475,911

UNITED STATES PATENT OFFICE 2,475,911

COMBUSTION APPARATUS

Matthew Lewis Nathan, Godalming, England, assignor to Power Jets (Research & Development) Limited, London, England Application October 9, 1945, Serial No. 621,336
In Great Britain March 16, 1944

10 Claims. (Cl. 60—44)

This invention relates to combustion apparatus and more particularly to an arrangement or form of combustion chamber forming part of a gas turbine power plant. The invention is primarily intended to meet the requirements of a jet-propulsion power plant for aircraft (in which class of case certain attributes are particularly desirable) but it is not essentially limited to this application. The improvements are directed to improve upon known combustion arrangements for plant in which a compressor provided with a plurality of outlets preferably disposed symmetrically in a circular series around the axis of the compressor—and preferably a bilateral-entry centrifugal compressor—delivers compressed air through combustion chambers to a gas turbine which drives the compressor, the exhaust from the turbine being the working stream for jet propulsion or to drive other apparatus.

Symmetry of arrangement is regarded as highly advantageous in such plant, and various factors have led to the practical outcome that the compressor should have a plurality of outlets, leading usually from corresponding diffuser channels in the compressor. In machines of high performance it is found that there exists a close intimacy between the compressor and its diffusers, the form of its outlets, and the design of the combustion chambers. Thus whilst one design of combustion equipment may operate satisfactorily with a given compressor, even a slight change for example of diffuser design, may call for modification of the combustion equipment. Moreover with multi-outlet compressors it follows that the outlets and the corresponding combustion chambers, operating in parallel may be difficult to harmonise and balance. It is requisite especially in aircraft power plant, to keep external dimensions down and to minimize weight. Mechanical reliability is of course also an important consideration. The invention seeks to meet these and numerous other practical requirements. Where the compressor is of bilateral intake type, it is necessary to leave free access for air to both sides of the compressor, and here again the present invention satisfactorily meets the problem.

It may be as well to mention that in the present state of the art, a compressor may have say ten outlets or more, arranged symmetrically around or near the margin of its casing; the turbine may be assumed to be coaxial with the compressor; and the combustion arrangements will be symmetrically disposed around the same axis and, in some cases, are interposed in an axial space between compressor and turbine. Each combustion chamber comprises one or more flame tubes. It is to such an arrangement that the present invention applies.

According to the invention the compressor outlets are associated in pairs (or pluralities) with each combustion chamber or flame tube by corresponding pairs or pluralities of ducts which are separate until they enter into association with each combustion chamber or flame tube.

According to a further feature of the invention, the combustion chambers are so proportioned that they have appropriate volumetric capacity to pass the air output of the two (or more) outlets instead of the previously accustomed one. Various adaptations (below described) within the combustion chamber, meet practical requirements of passing, burning, and mixing the increased flow of air which finally emerges from a single outlet to the turbine.

Such an arrangement differs from combustion chambers hitherto known in one somewhat striking manner; the ratio between length and volume is much modified, the length remaining of the same order whereas the volume is doubled or more than doubled. An immediate practical advantage is a reduction of pressure loss in the improved design, and this factor is one which reacts strongly on power plant performance. The actual weight of structure is also reduced, as well as the number of components, and therefore broadly speaking the complexity. Another advantage where aircraft plant is concerned is that by halving (or further reducing) the number of combustion chambers, the number of burners is also halved and this may have (by virtue of various reasons too elaborate for present description) an important favourable effect on high altitude operation especially in regard to running under idling conditions when engine speed may be determined by the lower limit of range of the burners.

The internal arrangements will be understood from the description which is given hereunder by way of example with reference to one form of embodiment of the invention. Since in all combustion designs of this type the result is finally determined empirically, there may be substantial departures from the precise form selected, but the embodiment described is one which has responded well on test.

The description is given by way of example with reference to the accompanying drawings in which:

Fig. 1 is an elevation in part section of a gas turbine engine system according to the invention;

Fig. 2 is a section along the line II—II of Fig. 1;

Fig. 3 is a plan view of a form of combustion apparatus according to the invention;

Figure 4:
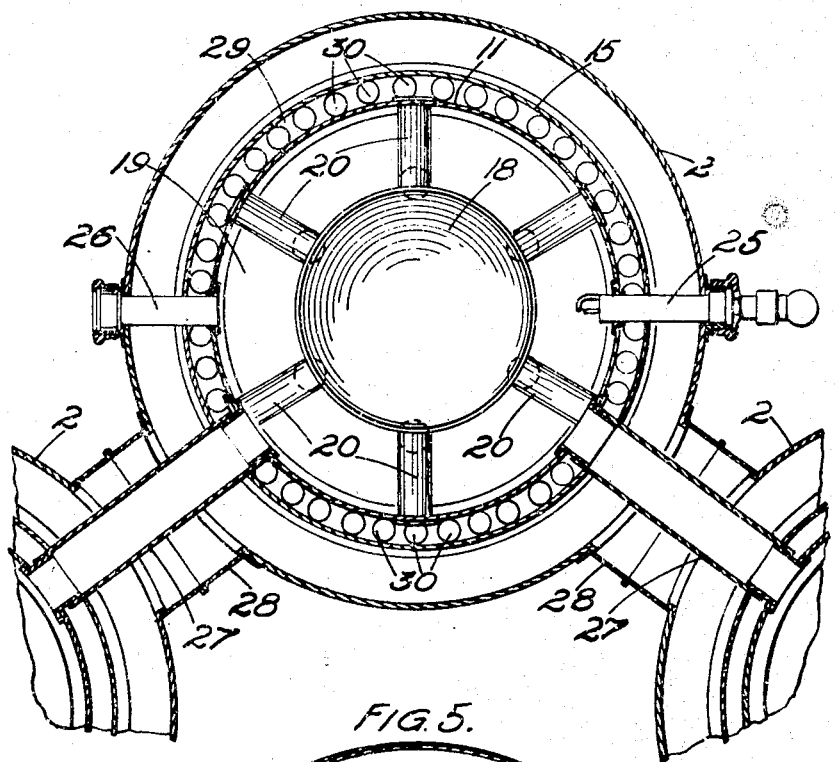
Fig. 4 is a section on the line IV—IV of Fig. 3.

Referring to the drawings, Fig. 1 shows the general arrangement of a propulsive system for aircraft to which the invention is intended to be applied. This system comprises a centrifugal compressor 1 provided with bilateral intakes 5 and driven by a turbine 3 mounted coaxially on the same shaft. The output from the compressor 1 is delivered to the combustion chambers 2 into which fuel is injected and in which combustion takes place. The hot gases are led through the turbine 2 thus driving it, then pass through an annular duct 4 provided between the jet pipe 23 and a conical fairing 24 and are finally emitted through an outlet (not shown) forming in this way a main propulsive jet stream.

As shown in Fig. 2 the compressor 1 is provided with ten outlets 22 arranged symmetrically around its casing and ducted in pairs to each combustion chamber 2, these chambers being so proportioned that they have appropriate volumetric capacity to pass the air output of the two outlets instead of the previously accustomed one. The combustion system comprises five such combustion chambers symmetrically disposed around the axis of the compressor.

Figure 5:
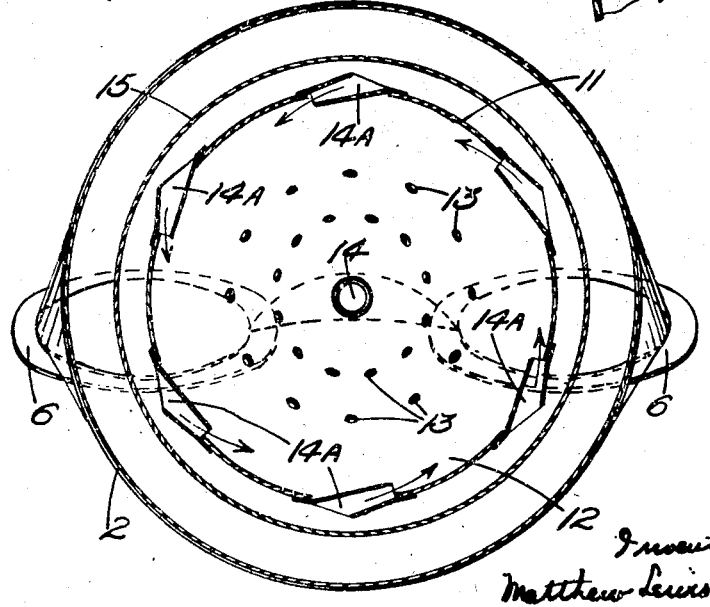
Fig. 5 is a section on the line V—V of Fig. 3.

Referring more particularly now to Fig. 3, each combustion chamber 2 comprises an air casing of generally symmetrical form the entry end of which is divided like a Y into two ducts 6 which connect to a pair of compressor outlets 22. Towards the downstream end of the air casing it tapers convergently at the portion 8 and is finally necked down to a segmental or part annular shaped outlet 9 which forms part of the entry to the nozzle chamber 10 (Fig. 1) of the turbine 3. Within the combustion chamber 2 is mounted a flame tube 11. This is a sheet metal body of substantially cylindrical form disposed coaxially within the casing 2. At its downstream end it is practically closed by a conical obturator or baffle 12 which has holes 13 in it to admit some primary air. Coaxially extending through the apex of the cone 12 is a burner 14 preferably of atomising type, the outer end of which protrudes through the wall of the combustion chamber 2 between the two ducts 6. In the wall of the flame tube 11 at the downstream end of the cylindrical portion are swirler entries 14 for primary air in the form of scoops or louvres arranged tangentially. As shown in Fig. 5 these swirlers admit air in the direction shown by the arrows and produce a whirling motion on the air which is admitted.

For a certain distance downstream from these swirlers 14 is fitted an externally spaced skirt 15 mounted on the flame tube 11 to prevent excessive heat radiation to the wall of the combustion chamber 2 and to give even distribution of the primary air to the swirler entries 14, the primary air having to pass around the downstream end of the skirt 15 before it can obtain access to these entries.

Still further downstream the wall of the flame tube 11 is fenestrated by apertures 16 for the admission of secondary air. Near the downstream end of the flame tube 11 there is fitted a conical baffle 18 coaxially which points downstream and which leaves an annular gap 19 (Fig. 4) between its edge and the flame tube wall through which the combustion products pass. This baffle 18 is supported by tubular struts 20 which pass relatively cool air inwards, thus themselves remaining sufficiently cool whilst the cool air emerges behind the baffle 18, impinging on it and cooling it also. Downstream from the baffle 18 the wall of the flame tube 11 is further pierced by slots 34 for the admission of tertiary air. Some or all of the apertures for secondary or tertiary air may be associated with stub pipes (not shown) to swirl or otherwise direct the inflowing air. The combustion chamber 2 also comprises an igniter plug 25 for initiating ignition when starting the engine, and a locating plug 26 for providing added rigidity.

The combustion chambers 2 are interconnected by inner connectors 27 and outer connectors 28 so that only one chamber 2 need be provided with an igniter plug 25, the remaining chambers being each ignited from its neighbour.

A ring 29 provided with apertures 30 is secured to the outer wall of the flame tube 11 and the inner wall of the chamber 2.

The provision of the downstream baffle 18 is of considerable importance in promoting good mixture and heat exchange thus materially shortening the time necessary for the completion of combustion whilst in a chamber of relatively large diameter such as that under consideration, it appears not to produce undue pressure loss.

I claim:

1. In a gas turbine power plant, a circular series of flame tubes disposed symmetrically around a common axis, a compressor having a plurality of outlets from and symmetrically disposed around the casing of said compressor and delivering air to said flame tubes, said compressor outlets being associated in groups of at least two with each flame tube by corresponding groups of ducts which are separate until they enter into association with said flame tube.

2. A gas turbine power plant according to claim 1, wherein, said tube is substantially closed towards its upstream end by a conical perforated obturator and is provided towards its upstream end with means adapted to direct primary air tangentially into said tube and to impart turbulence to said air, and is further provided towards said end with an external skirt in spatial relation to the external wall of said tube, with apertures for the admission of secondary air located downstream of the primary air directing means, towards its downstream end with a coaxial conical baffle pointing downstream and defining an annular gap between the periphery of said baffle and the flame tube wall, and with apertures downstream from said baffle for the admission of tertiary air.

3. A gas turbine power plant according to claim 2 wherein at least some of the apertures for non-primary air are associated with means for directing said air within the flame tube.

4. A gas turbine power plant according to claim 3 wherein said baffle is supported by tubular struts adapted to admit cool air to said baffle.

5. A gas turbine power plant according to claim 1 wherein said flame tube is substantially closed towards its upstream end by a conical perforated obturator and is provided towards its upstream end with means adapted to direct primary air tangentially into said tube and to impart turbulence to said air, and is further provided towards said end with an external skirt in spatial relation to the external wall of said tube, with apertures for the admission of secondary air located downstream of the primary air directing means, towards its downstream end with a co-axial conical baffle pointing downstream and defining an annular gap between the periphery of said baffle and the flame tube wall, and with apertures downstream from said baffle for the admission of tertiary air, at least some of the apertures for non-primary air being associated with means for directing said air within the flame tube, said baffle being supported by tubular struts adapted to admit cool air to said baffle.

6. A gas turbine power plant according to claim 1 wherein said tube is substantially closed towards its upstream end by a conical perforated obturator.

7. A gas turbine power plant according to claim 1 wherein said tube is substantially closed towards its upstream end by a conical perforated obturator and is provided towards its upstream end with means adapted to direct air tangentially into said tube and to impart turbulence to said air.

8. A gas turbine power plant according to claim 1, wherein said tube is substantially closed towards its upstream end by a conical perforated obturator and is provided towards its upstream end with means adapted to direct primary air tangentially into said tube and to impart turbulence to said air, and is further provided towards said end with an external skirt in spatial relation to the external wall of said tube.

9. A gas turbine power plant according to claim 1, wherein said tube is substantially closed towards its upstream end by a conical perforated obturator and is provided towards its upstream end with means adapted to direct primary air tangentially into said tube and to impart turbulence to said air, and is further provided towards said end with an external skirt in spatial relation to the external wall of said tube and towards its downstream end with a co-axial conical baffle pointing downstream and defining an annular gap between the periphery of said baffle and the flame tube wall.

10. A gas turbine power plant according to claim 1, wherein said tube is substantially closed towards its upstream end by a conical perforated obturator and is provided towards its upstream end with means adapted to direct primary air tangentially into said tube and to impart turbulence to said air, and is further provided towards said end with an external skirt in spatial relation to the external wall of said tube and with apertures for the admission of secondary air located downstream of the primary air directing means and towards its downstream end with a co-axial conical baffle pointing downstream and defining an annular gap between the periphery of said baffle and the flame tube wall.

MATTHEW LEWIS NATHAN.

REFERENCES CITED

The following references are of record in the file of this patent:

UNITED STATES PATENTS

| Number | Name | Date |
|---|---|---|
| 910,665 | Griepe | Jan. 26, 1909 |
| 990,222 | Brown | Apr. 25, 1911 |
| 2,164,954 | Stephens | July 4, 1939 |
| 2,332,866 | Müller | Oct. 26, 1943 |
| 2,353,929 | Ray | July 18, 1944 |